United States Patent [19]

Duffy

[11] Patent Number: 4,924,796
[45] Date of Patent: May 15, 1990

[54] REPLACEABLE INFLATION VALVE

[75] Inventor: Keith Duffy, Gloversville, N.Y.

[73] Assignee: Nelson A. Taylor Co., Inc., Gloversville, N.Y.

[21] Appl. No.: 180,339

[22] Filed: Apr. 11, 1988

[51] Int. Cl.$^5$ .............................................. B60C 23/10
[52] U.S. Cl. .................................. 114/219; 114/220; 251/357; 137/234.5; 137/234; 441/41
[58] Field of Search ..................... 114/218–220, 114/52, 54; 441/30, 40, 41; 138/89, 93; 29/157.1 A, 157.1 R; 141/68; 244/98; 5/448, 449; 251/84, 356, 357; 446/220; 152/415, 429, DIG. 7; 137/232, 234, 234.5, 223, 233

[56] References Cited

U.S. PATENT DOCUMENTS

| | | | |
|---|---|---|---|
| 623,029 | 4/1899 | McCollum | 137/223 |
| 1,917,499 | 7/1933 | Conrad | 137/234.5 |
| 1,991,974 | 2/1935 | Broecker | 137/234.5 |
| 2,069,105 | 1/1937 | Engle | 137/223 |
| 2,142,044 | 12/1938 | Broecker | 137/234.5 |
| 2,179,125 | 11/1939 | Kirlin | 114/219 |
| 3,020,669 | 2/1962 | Beyer-Olsen et al. | 264/304 |
| 3,465,780 | 9/1969 | Duymelinck et al. | 137/234.5 |
| 3,480,035 | 11/1969 | Szanto | 137/234.5 |
| 4,357,891 | 11/1982 | Sluys | 114/219 |
| 4,378,749 | 4/1983 | Leblanc | 114/214 |
| 4,462,449 | 7/1984 | Zabel | 137/234.5 |

*Primary Examiner*—Joseph F. Peters, Jr.
*Assistant Examiner*—Clifford T. Bartz
*Attorney, Agent, or Firm*—Nixon & Vanderhye

[57] ABSTRACT

A replaceable inflation valve for a marine fender wherein, in one embodiment, the valve is slidably received in a valve seat formed in the fender, and wherein a bored collar is threadably received in the valve seat to hold a flexible member of the valve in place in the fender. The upper portion of the flexible member of the valve is received within the bore formed in the collar to provide access to the flexible member of the valve when the collar is in place. The flexible member of the valve comprises an elongated tubular member with one open end and one normally closed end. The normally closed end is openable by insertion of a needle valve through a slit therein. Upon removal of the needle valve, the slit closes on itself by reason of the inherent resiliency of the flexible member.

37 Claims, 2 Drawing Sheets

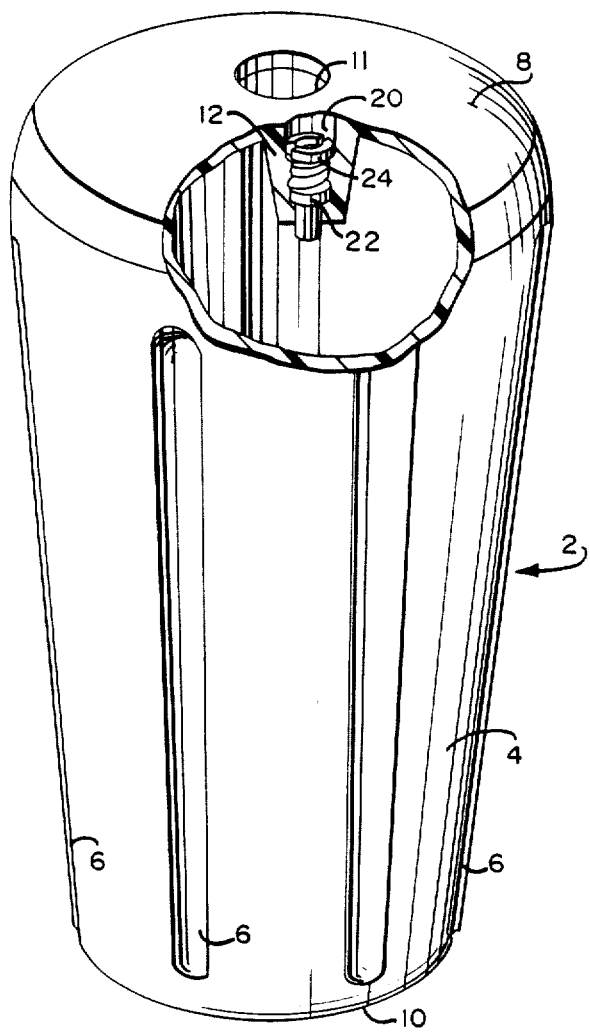
FIG. 1
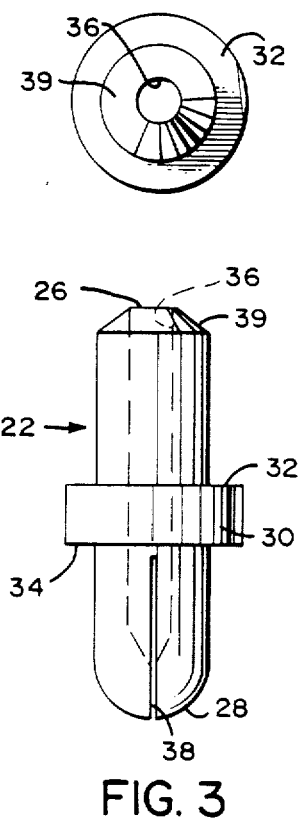
FIG. 4
FIG. 3
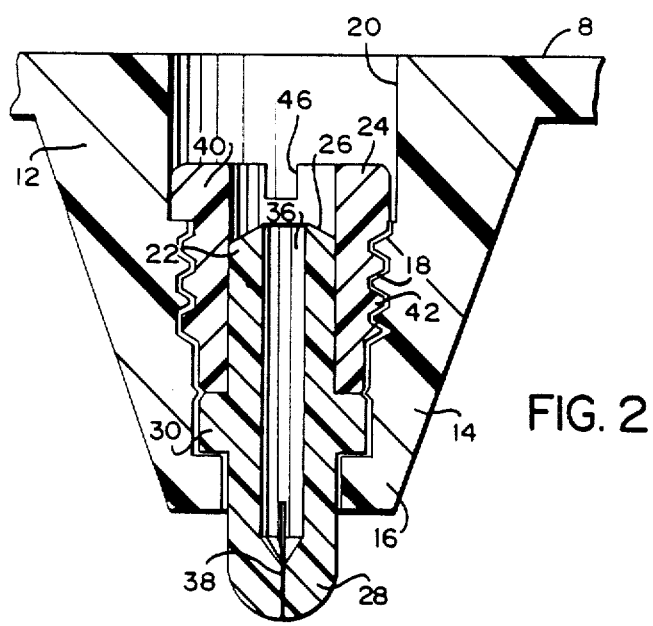
FIG. 2

REPLACEABLE INFLATION VALVE

BACKGROUND AND SUMMARY OF THE INVENTION

This invention relates generally to a valve for inflatable devices, and particularly, to an easily replaceable valve for an inflatable marine fender. Inflatable pneumatic fenders are typically used to provide a cushion between boat hulls and docks or wharfs to which the boats are tied. Pneumatic fenders are often favored because of their inherent resiliency, and because they prevent marring of boat hull surfaces. Fenders of this type are typically provided with inflation valves for initially inflating the fender, and for periodically replenishing the supply of air to maintain maximum efficiency.

It is often the case, however, that the valve body itself is exposed, i.e., located so as to project above or outside the exterior surface of the fender. As such, the valve assembly is subject to damage from periodic compressive engagement with the dock or wharf, or from relative movement while trapped between the boat hull and the dock or wharf. Damage to the valve assembly can render the fender useless if no provision is made for a protected, and easily replaceable valve assembly which is also airtight.

For example, in U.S. Pat. No. 2,179,125, a typical inflation valve is disclosed which projects outwardly from a lower end surface of an otherwise cylindrical fender body. The valve body is sealed in place to an interior bladder.

In the present invention, a unique valve design is provided which enables the valve to be located at or below the external surface of the fender, while permitting easy inflation of the fender, and easy removal and replacement in the event of damage to the valve. In a preferred embodiment, the valve comprises a flexible hollow tubular member which is open at a first upper end and normally closed at a second lower end, and a collar member threadably receivable within the fender body, and provided with a centrally located bore which is adapted to receive the upper portion of the flexible hollow tubular member. The flexible member is formed with a radially outwardly extending flange intermediate its first and second ends for seating engagement with a complimentary surface provided in a valve seat integrally formed in the fender body. The collar member has a lower surface which engages the radially outwardly directed flange provided on the flexible valve member. In the event of damage to the valve structure, the collar member is merely unscrewed from the fender body, permitting the flexible member to be slidably removed from the fender and easily replaced.

The valve as described, and when installed in a fender, can be used with a conventional needle valve to inflate the fender.

An additional advantage of the present invention is that the valve can be removed to allow rapid inflation of the device with a compressed air system.

Moreover, in the event that it is desirable to replace the valve of this invention with a different type, e.g., a one-piece rigid plug, the valve is easily removed to facilitate such replacement.

The normally closed end of the flexible valve member is provided with a slit adapted to be opened by the insertion of a conventional needle valve in a manner which will be well understood by those of ordinary skill in the art. The flexible member is preferably constructed of an elastomer such as nitrile, thermoplastic rubber, or natural rubber to provide sufficient resiliency so that upon removal of a needle valve, the slit in the normally closed end of the flexible member will close on itself and prevent escape of air from within the fender.

The collar member is preferably constructed of a rigid thermoplastic material such as nylon or nylon alloy, lexan, polycarbonate, or other suitable material.

In an exemplary embodiment of the invention, the upper portion of the collar member is provided with an enlarged head formed with tool engaging means, such as a screwdriver slot, to facilitate easy removal of the collar member and flexible member from the fender.

In an alternative arrangement, the collar and flexible members may be mechanically joined to further facilitate removal and installation of the valve. For example, the flexible member may be friction fit within the collar, or a snap-fit configuration may be provided. The collar and flexible members may also be adhesively joined.

It will be appreciated that the valve seat that receives the flexible member and the collar member may be molded into the fender body itself as an integral unit, or be a separately molded piece that is subsequently molded into the fender body. The valve seat is preferably made of flexible PVC, 40 to 90 durometer, on the shore A scale.

It will also be understood that the valve as described above may be of other multiple piece designs, i.e., where the collar member extends full length of the flexible member, or may also be of molded one-piece construction, i.e., where the collar and flexible members are formed as an integral valve which may be threadably mounted in the valve seat.

Other objects and advantages of the invention will become apparent upon further inspection of the detailed description of the invention which follows.

BRIEF DESCRIPTION OF THE DRAWINGS

FIG. 1 is a perspective view of a marine fender partially cut away in section to illustrate an inflation valve in accordance with an exemplary embodiment of this invention;

FIG. 2 is a cross-sectional view taken through an inflation valve illustrated in FIG. 1;

FIG. 3 is a detailed front view of an elongated flexible valve member of the inflation valve illustrated in FIGS. 1 and 2;

FIG. 4 is a top plan view of the elongated flexible member illustrated in FIG. 3;

DETAILED DESCRIPTION OF THE DRAWINGS

Figure 6:
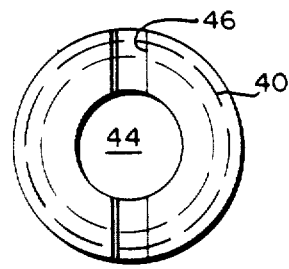
FIG. 6 is a top plan view of the collar member illustrated in FIG. 5.

In FIG. 1, there is shown an inflatable marine boat fender 2 of the type comprising a generally cylindrical body 4 provided with longitudinally extending ribs 6 spaced about the circumference thereof. First and second end portions 8, 10 are also provided with a central bore defined by a tube 11 extending through the fender from one end to the other. Tube 11 would typically receive a rope or other elongated strand for securing the fender to a dock, wharf or boat hull.

In one end surface 8 of the fender 2 adjacent the tube 11, there is integrally formed a valve seat 12 including a recessed bore 20 in which there is seated a flexible hollow tubular member 22 and a collar member 24. It will be noted the collar member 24 and flexible member 22 are recessed from the end surface 8 of the fender to protect the valve from damage.

In FIG. 2, the inflation valve is illustrated in greater detail, while in FIGS. 3, 4, 5 and 6 the components of the valve are individually illustrated.

The valve seat 12, formed in the upper end surface 8 of the fender 2, comprises an integrally molded substantially conical portion 14 truncated to form inwardly directed supporting shoulder 16. The seat is also provided with a screw thread portion 18 intermediate the shoulder 16 and a smooth upper portion of the bore 20.

It will be appreciated that the valve seat could also be a separately molded piece which is subsequently molded into the fender during manufacture of the latter.

The inflation valve itself, in one exemplary embodiment, comprises a flexible, elongated tubular member 22 of generally cylindrical configuration, and an associated collar member 24. The flexible valve member 22 is preferably constructed of a resilient, flexible elastomer such as a nitrile, thermoplastic rubber, or natural rubber, and is formed with a first open end 26 and a second, normally closed end 28. Intermediate the first and second ends, there is integrally formed a radially, outwardly directed flange 30 having an upper surface 32 and a lower surface 34.

The flexible valve member 22 is further formed with a bore 36 extending from the first open end 26 to the second normally closed end 28. A slit 38 extends through the normally closed end to permit insertion of a conventional needle valve (not shown) through the bore 36 and slit 38 for inflation of the fender.

It will be understood that upon withdrawal of the needle valve, the slit 38 closes on itself to prevent escape of air from the interior of the fender. In FIG. 3, slit 38 is shown slightly opened, merely for ease of understanding.

As clearly illustrated in FIG. 2, the lower surface 34 of flange 30 engages the inwardly directed shoulder 16 of the fender seat 12 to support the valve in a recessed position within the bore 20.

Figure 5:
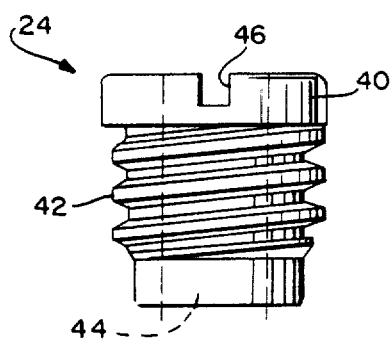
FIG. 5 is a front view of a collar member of the inflation valve illustrated in FIGS. 1 and 2.

In order to hold the flexible valve element 22 within the fender seat, a collar member 24 is employed, the details of which are shown in FIGS. 5 and 6. The collar member 24 is preferably formed of a rigid thermoplastic material such as nylon, nylon alloy, lexan, polycarbonate, etc. The collar member has the general configuration of a bolt, including an enlarged upper head 40 and a threaded body portion 42. The head 40 is further provided with a tool engaging surface such as the conventional screwdriver receiving slot 46. It will be understood by those of ordinary skill in the art that other tool engaging configurations could also be employed. A centrally located through-bore 44 is formed within the collar member and sized to slidably receive that portion of the flexible member which extends above the flange 30.

Once the flexible member 22 is inserted fully within the bore 20 in the valve seat 12, the collar member 24 is threadably secured within the valve seat until its lower edge engages the upper surface 32 of the flange 30. In this way, the flexible valve member 22 is securely held in a sandwich configuration between the lower edge of the collar member 24 and the support shoulder 16 of the seat 12. To facilitate the initial orientation and placement of the collar member 24, and to prevent damage to the upper edge of the flexible valve member 22, the upper open end 26 of the flexible valve member is tapered as at 39.

It will be appreciated that the in the event of damage to, or general deterioration of the inflation valve, removal and replacement is greatly facilitated by the above described configuration. Specifically, one need only unscrew the collar member 24, remove the flexible member and insert a new valve. Alternatively, if the collar and flexible members are mechanically or adhesively secured together, one need only unscrew the collar member to thereby remove the valve.

It will further be appreciated that removal of the collar member 24 is not required in order to inflate the fender. Rather, a conventional needle valve may be inserted through the collar member bore 44, flexible member bore 36, and through the slit 38 into the fender interior. Upon removal of the needle valve, the resilient flexible member slit closes upon itself to prevent escape of air from within the fender.

Alternatively, the valve may be removed and the fender inflated by other means such as a compressed air device, and the valve thereafter reinstalled.

Figure 7:
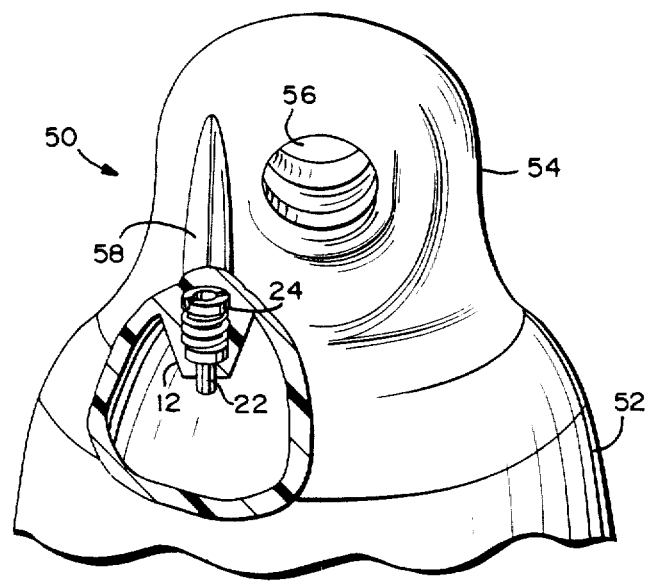
FIG. 7 is a perspective view of another type of marine fender, partially cut away in section, incorporating an inflation valve in accordance with this invention.

FIG. 7 illustrates the use of an inflation valve as previously described in conjunction with the different type of marine fender. In the FIG. 7 embodiment, the fender 50 has a generally cylindrical main body portion 52, a solid ear portion 54 located at one end thereof, an aperture 56 formed within the ear. A valve seat 12, flexible valve member 22, and collar member 24 as previously described are shown mounted in the marine fender in a transitional area extending between the solid ear portion 54 and the main body portion 52. A grooved portion 58 is provided in the ear 54 to permit direct engagement of a tool, such as a screwdriver, with the collar member 24.

It will, of course, be understood by those of ordinary skill in the art that the inflation valve described herein may be used with fender configurations in addition to those illustrated in FIGS. 1 and 7, and with any number of inflatable devices generally, where protection from damage, replaceability and/or flexibility in terms of the ability to utilize alternative inflation means, such as compressed air devices, are considered desirable.

It will be further understood that the flexible valve member 22 and collar member 24 may be formed in other multiple piece configurations or as an integral, one-piece molded valve which may be easily mounted and removed from a valve seat via the previously described screw-threaded mounting of the valve within the valve seat.

While the invention has been described in connection with what is presently considered to be the most practical embodiments, it is to be understood that those of ordinary skill in the art could make various changes and modifications therein without departing from the spirit and scope of the invention as defined in the claims which follow.

What is claimed is:

1. A replaceable marine fender inflation valve comprising
    collar means provided with a bore extending therethrough along a longitudinal axis thereof;

connection means formed on an exterior surface of said collar means and adapted for engagement with complimentary means provided in the marine fender such that said collar means may be seated within the fender; and flexible means received within said bore including means for cooperating with said collar means such that said collar means may retain said flexible means within the fender.

2. A fender inflation valve as defined in claim 1, wherein said connection means comprise screw threads.

3. A fender inflation valve as defined in claim 1, wherein said collar means is formed with an upper flanged portion provided with tool engaging means.

4. A fender inflation valve as defined in claim 3, wherein said collar means is constructed of a relatively rigid thermoplastic material.

5. A fender inflation valve as defined in claim 1, wherein said flexible means comprises a tubular member formed with a first open end and a second normally closed end.

6. A fender inflation valve as defined in claim 5 wherein said tubular member is provided with a radially outwardly directed circumferential flange intermediate said open and normally closed ends.

7. A fender inflation valve as defined in claim 6, wherein, in an operative position, an upper surface of said flange engages said collar means and a lower surface of said flange is adapted to engage a shoulder provided in a valve seat formed in said fender.

8. A fender inflation valve as defined in claim 5, wherein said normally closed end of said tubular member is provided with slit means extending therethrough and adapted to be opened upon insertion of an air supply needle valve.

9. A fender inflation valve as defined in claim 5 and wherein said tubular member is constructed of a resilient, elastomeric material.

10. A fender inflation valve as defined in claim 1 wherein said collar means and flexible means are joined by adhesive means.

11. A replaceable air supply valve for an inflatable member comprising:

flexible means provided with means adapted to cooperate with collar means, said collar means adapted to be secured in the inflatable member, and said collar means adapted to engage said flexible means so that when said valve is seated in the inflatable member, the collar means holds said flexible means therein and in engagement therewith, whereby, upon removal of said collar means, said flexible means is slidably removable from the inflatable member.

12. A replaceable valve as recited in claim 11, wherein said flexible means comprises a tubular member formed with an open end and a normally closed end, and is provided with a slit in said closed end, said slit being openable upon insertion of a needle valve, and closable upon removal of said needle valve to seal the inflatable member against escape of air.

13. A replaceable valve as recited in claim 12 wherein said tubular member is formed of a resilient elastomeric material.

14. A replaceable valve as recited in claim 12, wherein said tubular member is substantially cylindrical and includes a radially outwardly directed flange formed intermediate the open and closed ends thereof.

15. A replaceable valve as recited in claim 14 wherein, in an operative position, an upper surface of said flange engages said collar means and a lower surface of said flange is adapted to engage a shoulder provided in a valve seat formed in said fender.

16. A replaceable valve as recited in claim 14, wherein said collar means comprises an annular member formed with a central bore extending therethrough to receive the tubular member, a lowermost surface of said annular member adapted to engage said radially outwardly directed flange.

17. A replaceable valve as recited in claim 16, wherein said annular member and said tubular member are joined by adhesive means.

18. A replaceable valve as recited in claim 11, wherein said collar means is provided with screw threads so that said collar means may be threadably secured to said inflatable member.

19. A replaceable valve as recited in claim 11, wherein said collar means is constructed of a relatively rigid thermoplastic material.

20. A marine fender comprising:

an inflatable body provided with means for supporting and securing an inflation valve;

an inflation valve provided with means for engaging said supporting and securing means; said inflation valve comprising flexible means and collar means for releasably holding said inflation valve within said fender, whereby said collar means comprises an annular member formed with a centrally located bore for receiving a portion of said flexible means.

21. A replaceable valve for an inflatable member, said valve being of the type which includes means for receiving a needle-type air supply valve to effect inflation of the inflatable member, said valve comprising:

an elongated tubular member formed with a first open end and a normally closed second end; and retaining means at least partially surrounding said tubular member and permitting said valve to be removably inserted into the inflatable member, said retaining means including a tool receiving slot for facilitating insertion and removal of said valve.

22. A marine fender as recited in claim 20, wherein said annular member is threadably secured within said fender, and said annular member is formed with tool engaging means.

23. A marine fender is recited in claim 22, wherein said annular member is formed with a radially enlarged upper portion, said tool engaging means comprising a screwdriver slot formed in said upper portion.

24. A marine fender as recited in claim 20, wherein said flexible means comprises a tubular member having a first open end and a second, normally closed end.

25. A marine fender as recited in claim 24 wherein said tubular member is provided with a radially outwardly directed circumferential flange intermediate said open and normally closed ends.

26. A marine fender as recited in claim 24, wherein said tubular member is constructed of a resilient elastomeric material, said normally closed end provided with means adapted to permit insertion of a needle valve for inflating said fender, and for sealing said fender upon removal of said needle valve.

27. A marine fender as recited in claim 20, wherein said supporting means comprises a valve seat molded integrally into said fender.

28. A marine fender as recited in claim 20, wherein said supporting means comprises a valve seat molded separately, and subsequently molded into said fender.

29. A marine fender as recited in claim 27, wherein said seat is formed with a centrally located bore, and a shoulder surface for engaging a flange provided on said flexible means.

30. A marine fender as recited in claim 28, wherein said seat is formed with a centrally located bore, and a shoulder surface for engaging a flange provided on said flexible means.

31. A marine fender as recited in claim 29, wherein said securing means comprises screw threads formed in said valve seat and adapted to threadably receive said collar means.

32. A replaceable valve for an inflatable member, said valve being of the type which includes means for receiving a needle-type air supply valve to effect inflation of the inflatable member, said valve comprising:
   flexible means formed with a first open end and a normally closed second end; and
   a securing means at least partially surrounding said flexible means and adapted to be removably attached to the inflatable member, and including means adapted to engage said flexible means and retain said flexible means in the inflatable member.

33. A replaceable valve as defined in claim 32, wherein said normally closed second end of said flexible means is formed with an openable slit therein.

34. A replaceable valve as defined in claim 33, wherein said securing means is formed with a bore permitting a needle valve to be inserted through said securing means and said first open end of said flexible means and through said openable slit formed in said normally closed second end of said flexible means.

35. A fender inflation valve as defined in claim 16 wherein said collar means and flexible means are joined by mechanical means.

36. A fender inflation valve as defined in claim 1 wherein said collar means and flexible means are joined by mechanical means.

37. A marine fender comprising:
   an inflatable body provided with means for supporting and securing an inflation valve; and an
   inflation valve provided with flexible means for engaging said supporting means, and securing means for releasably mounting said inflation valve within said fender.

* * * * *